United States Patent [19]

Batutis

[11] Patent Number: 4,643,834

[45] Date of Patent: Feb. 17, 1987

[54] SEPARATION SYSTEM USING COALESCING TECHNIQUES

[75] Inventor: Edward F. Batutis, Phoenixville, Pa.

[73] Assignee: Filter Plate Company, Gastonia, N.C.

[21] Appl. No.: 825,650

[22] Filed: Feb. 3, 1986

[51] Int. Cl.[4] ............................................. B01D 21/10
[52] U.S. Cl. ................................... 210/740; 210/742; 210/802; 210/522; 210/527
[58] Field of Search ............... 210/739, 740, 742, 801, 210/802, 527, 522

[56] References Cited

U.S. PATENT DOCUMENTS

| | | | |
|---|---|---|---|
| 1,968,031 | 7/1934 | Donohue | 210/521 |
| 3,563,389 | 2/1971 | Mizrshi et al. | 210/532 |
| 3,727,770 | 4/1973 | Mochizuki | 210/522 |
| 3,813,851 | 6/1974 | Eder | 55/52 |
| 3,826,740 | 7/1974 | Jewett | 210/521 |
| 3,847,813 | 11/1974 | Castelli | 210/522 |
| 3,963,624 | 6/1976 | Henderson et al. | 210/521 |
| 4,040,961 | 8/1977 | Davis, Jr. et al. | 210/522 |
| 4,066,545 | 1/1978 | Walters et al. | 210/742 |
| 4,199,451 | 4/1980 | Hsiung et al. | 210/260 |
| 4,400,280 | 8/1983 | Larsson et al. | 210/802 |
| 4,544,486 | 10/1985 | Bosndak | 210/522 |

Primary Examiner—Frank Sever
Attorney, Agent, or Firm—Bell, Seltzer, Park & Gibson

[57] ABSTRACT

A method and apparatus for gravitational separation of discontinuous mixtures using laminar flow coalescing techniques is disclosed. The apparatus includes a number of discrete sets of fluid interrupting surfaces arranged in series one after the other. After analyzing the physical, chemical and statistical characteristics of any given discontinuous mixture, the configuration of the surfaces can be correlated or adjusted to provide enhanced and efficient separation of the components of the mixture.

39 Claims, 14 Drawing Figures

SEPARATION SYSTEM USING COALESCING TECHNIQUES

FIELD OF THE INVENTION

The present invention relates to the separation of individual components from discontinuous mixtures and is particularly directed towards gravitational separation using laminar flow coalescing techniques.

BACKGROUND OF THE INVENTION

The separation of components from mixtures is a common problem in many industrial situations. A number of methods have been developed for separating the components of various mixtures from one another and typical methods include filtration, centrifugation, extraction and sedimentation.

Filtration generally comprises passing a discontinuous mixture through a barrier which is porous to one component but impenetrable to a second component, generally because the sizes of the individual particles or agglomeration of particles in the two components is different enough to make separation possible. One disadvantage of filtration, however, is that where the components are discontinuous but the individual particles or agglomeration of particles are approximately the same size, any barrier which will pass one component may also pass the other and any barrier which will stop one component may also stop the other. Accordingly, filtration is not appropriate for all types of separations.

Centrifugal separation is based on the difference between either the absolute mass or density of the different components of a discontinuous mixture. Consequently, the forces which are applied to a mixture in a centrifugal separator affect particles of different masses or densities to a greater or lesser extent so that they can be separated based on the degree to which they are affected. Typically, the forces exerted in a centrifugal separator will carry different components to different portions of the separator. Nevertheless, where the difference in absolute mass or density is not significant enough to discriminate between particles or agglomerations of particles, centrifugal separation will be ineffective. Additionally, because centrifugal separators operate on high speed rotation, they are an energy-intensive method of separation.

In extraction techniques, a discontinuous mixture is further mixed with a solvent in which one of the components of the mixture is miscible and in which the other component is immiscible. When mixed with the extraction solvent, the miscible component enters the extraction solvent and when the extraction solvent is then separated from the mixture, it carries the miscible component with it, thus providing the separation. Extraction technology depends, however, on the availability of appropriate solvents, is not always practicable for all types of separation requirements, and requires energy input to remove the miscible component from the solvent.

Sedimentation, as the name implies, simply allows a heavier component to settle out from a mixture under the influence of gravity. While very effective in certain circumstances, sedimentation is essentially a batch process, can require large amounts of time and extensive storage facilities and requires energy to either recover the liquid or remove the sediment, or both.

Yet other types of separation are the coalescence techniques, which are based partially on sedimentation and partly on the tendency of like materials to agglomerate or "grow" when given the opportunity to come into contact with one another. In typical coalescence techniques, a discontinuous mixture of a fluid continuous phase and either a fluid or solid discontinuous phase are encouraged to flow in a laminar manner while being provided with opportunities to collide with each other or with wettable coalescent barriers; e.g. barriers amenable to being wetted by those droplets. As used herein, the term laminar flow represents a continuous flow of fluid characterized by the lack of turbulence. By avoiding turbulence, a gravitationally-influenced separation can take place even while the mixture is flowing.

In coalescence techniques, individual droplets of a fluid are initially attracted towards one another by Van der Waals forces and agglomerate to form small clusters of droplets. This process is known as "flocculation". At some stage the attraction between the droplets becomes greater than the surface tension so that the droplets lose their individual "skins" and merge or "coalesce" into an even larger droplet.

As is known to those familiar with fluid behavior, droplets have a "skin" of molecules bound together by surface tension, a configuration dictated by the thermodynamic tendency of materials to reach their state of lowest potential energy. The magnitudes of surface tension forces grow progressively smaller as individual coalesced droplets grow larger and exhibit correspondingly larger surface areas. Thus, the larger and larger droplets more easily continue to coalesce into even larger droplets, and finally into pools of separated liquids.

Where turbulence is avoided, flocculation and coalescence—and hence separation—all take place more efficiently.

The rate at which or the ease with which coalescence takes place also depends to a large extent upon the population and size distribution of the particles or droplets of the discontinuous (sometimes referred to as the "dispersed") phase. Particles or droplets on the order of 1 mm or more in diameter generally settle or rise rapidly on their own. At the other extreme, particles with diameters on the order of 5-10 microns or less settle or rise very slowly and are often referred to as "permanent" or "stable" emulsions, because they are least affected by gravitational forces. Particles 4-5 microns or less in diameter enter the Brownian motion regime caused by the molecular vibration of the continuous phase. Below 0.5 microns, the particles behave almost as if in solution and normally cannot be separated by gravitational forces unless they collide, flocculate and/or coalesce.

In some typical coalescing techniques and equipment, a discontinuous mixture in which the continuous phase is a liquid is passed through a container having a number of continuous stacked parallel plates therein. The parallel plates keep the flow laminar as the mixture flows from the inlet to the outlet portions of the equipment. The plates generally have some sort of openings or "weep holes" in them so that given the laminar nature of the flow and the influence of gravity, the less dense component may move upwardly. Similarly, if the plates are properly tilted, any more dense discontinuous component, solid or liquid, will settle and slide downward.

In a further refinement of such devices, the plates are formed into specific shapes, generally sinusoidal configurations, i.e. S-shaped curves, so that individual particles or droplets in the components of a mixture flowing sinusoidally in a laminar fashion through such a device will eventually intercept one of the surfaces of one of the plates. Sinusoidal plates also provide more surface area than do more planar surfaces. Ideally, when an individual particle or droplet of the discontinuous phase approaches one of the curving surfaces one of several possible effects will take place: first, it may either immediately meet like particles and agglomerate or floc with them, or the droplet may travel along the surface until it meets a like particle and can agglomerate. Where the discontinuous phase is a liquid, it will eventually form a pool at the apex of each of the curves. The agglomeration accomplishes the separation as each agglomeration activity comprises the growth of a more distinct phase out of what was originally a mixture. As droplets move upwardly through the weep holes or downwardly along the inclined surface they continue to agglomerate and concentrate so that an overall separation takes place after a certain amount of travel, called "retention time" or "residence time", between such plates has taken place.

As a second possibility, the droplets of a liquid discontinuous phase may collide with other droplets and form clusters which, because of their relative bulk density, rise faster. The collision often ruptures the interfacial tension "skin" which surrounds and forms droplets of all types, making it easier for the droplet material to agglomerate or grow into larger, more buoyant droplets.

Finally, the particles may "wet" the surface which interrupted their flow, thereby remaining on the surface and providing a layer or film of separated component with which further particles will come in contact, agglomerate and hence separate. In short, the approaching particles "see" the film of like material rather than the surface underneath. This layer in turn will flow in a particular direction, depending on its relative density with respect to the continuous phase.

Although such techniques and equipment for accomplishing phase separation have had some successful applications, they are limited by several inherent characteristics which have been typical of such techniques and equipment to date. First of all, the plates and their arrangement has been fixed and static, i.e. once the plates have been put into place, the sole configuration of the separator is determined.

Secondly, it will be understood by those familiar with separation that if any early separation takes place along the laminar flow path, then the characteristics of the mixture being separated will be progressively different as the mixture travels through the separator. Generally speaking, the larger droplets or particles of the discontinuous phase will separate out first, so that the discontinuous phase will progressively contain a larger and larger percentage of smaller and smaller particles; i.e. those which become progressively more difficult to separate. Nevertheless, because the plates are fixed in static position, spacing and configuration, the maximum or optimal configuration for separation is only achieved once and then never again. Additionally, because the particular process forming the mixture may change, the mixture itself may change, thus rendering the separator ineffective.

In short, while the characteristics of a mixture being separated will be constantly changing, the equipment remains the same and is only ideally suited for optimal separation of a mixture with one particular set of characteristics, but will be less than optimal for all other sets of characteristics even as that one discontinuous mixture moves through the separator.

Additionally, because a large number of such plates must be used in close configuration with one another in such laminar flow separators, they are typically made of plastic to reduce their weight and cost and to form a wettable surface with certain discontinuous components, particularly oils. Nevertheless, being an organic material, plastic can be affected by oily mixtures resulting in swelling, distortion, softening and even dissolution of the plates. Additionally, plastic limits the temperature ranges within which the equipment can be operated. Thus, although heating the discontinuous mixture can result in enhanced separation, the limitation of the plastic materials to withstand heat will likewise limit the potential of using temperature adjustment to increase the efficiency of separation. Finally, because the plates are generally molded, static and fixed in position, they can never be adjusted when mixtures of differing characteristics must be separated. In short, any particular typical laminar flow separator is generally suited to separate only one type of discontinuous mixture and even when so suited will only separate that mixture at one particular instantaneous makeup and will be disadvantageous for all other makeups of even the discontinuous mixture that it was designed for.

Most coalescing and laminar flow separation techniques are based, either implicitly or explicitly, upon Stokes' Law which predicts the motion of a particle suspended in a fluid under the influence of the force of gravity. Stokes' Law can be expressed by the following formula:

$$v = \frac{2gr^2(d_1 - d_2)}{9u}$$

Where $v$=the rate at which the particle will settle or rise, called the "terminal velocity"; $g$=the acceleration of gravity; $r$=the particle's radius; $d_1$=the density of the particle; $d_2$=the density of the liquid; and $u$=the viscosity of the liquid. This basic relationship and other related ones can be expressed in a number of ways which are generally familiar to those aquainted with the scientific bases of fluid behavior.

Where enough turbulence is eliminated to achieve laminar flow, the motion within the continuous phase of a particle or droplet of the discontinuous phase component will be characterized by the resultant of its lateral motion as it is carried along by the laminar flow and its vertical motion described by Stokes' Law. Accordingly, because like materials tend to agglomerate, if the movement of the particles of the discontinuous phase can be encouraged to favor agglomeration, separation will be enhanced. Most laminar flow separators accomplish this with the plates described heretofore.

Nevertheless, like many physical laws (e.g. the ideal gas law), Stokes' Law represents an idealized law which describes the behavior of all such mixtures generally but none specifically. Thus, all real mixtures will differ somewhat from the idealized expression of Stokes' Law, basically because of the difference between actual conditions and the assumptions that must be made in order to even attempt to predict such behavior; e.g. the assumption that particles are spherical, the assumptions which go into figuring viscosity, and a number of other like estimations. Furthermore, Stokes' law only predicts the terminal velocity of a single particle of a single size in the absence of any other like particles. Stokes' law does not deal with real life situations in which many such particles of many sizes are affecting one another, and in which particles move and accelerate at any number of velocities from rest up to their terminal velocity.

To date, laminar flow coalescing-type separation techniques have not attempted to either compensate for, or indeed take advantage of the particular differences between a mixture's actual behavior and its behavior as predicted by Stokes' Law. Consequently, no current laminar flow, coalescence-type separation techniques are ideally suited for more than relatively gross separations, e.g. oil from water, machine scarf from machine fluid, dirt from oil, and the like.

It is thus an object of the present invention to provide a method and apparatus for separating the components of a mixture of a continuous phase and a discontinuous phase in which the continuous phase comprises a liquid which method and apparatus is tailored to the physical, chemical and statistical characteristics of the components of the mixture and which can correlate the configuration of the separation apparatus according to both the initial characteristics of the discontinuous mixture and the intermediate characteristics of the discontinuous mixture as it progressively separates.

It is a further object of this invention to provide a method for analyzing, determining and predicting the characteristics of the discontinuous mixture and its components in order to correlate the configuration of the apparatus to these characteristics.

It is another object of the invention to provide an apparatus which can be progressively correlated to such characteristics as a discontinuous mixture is being separated.

It is a further object of this invention to provide an apparatus which can be used over a wide range of temperatures so that discontinuous mixtures can be heated or cooled as necessary to enhance their separation.

The foregoing and other objects, advantages and features of the invention, and the manner in which the same are accomplished will be more readily apparent upon consideration of the following detailed description of the invention taken in conjunction with the accompanying drawings, which illustrate preferred and exemplary embodiments and wherein.

DETAILED DESCRIPTION OF THE INVENTION

The invention comprises a method and apparatus for separating the components of a mixture of a continuous phase and a discontinuous phase in which the continuous phase comprises a liquid. As shown in overall schematic view in FIG. 1, the method comprises analyzing and determining the physical, chemical and statistical characteristics of the discontinuous mixture and its components. As set forth earlier herein, with regard to the laminar flow of fluids and the movement of particles within fluids according to Stokes' Law, such characteristics include the temperature, density and viscosity of the liquid continuous phase; the droplet size distribution, population, density and viscosity of a discontinuous liquid phase; and the size, population, density, shape and texture of the particles of a discontinuous solid phase.

Many of the above properties can be determined by conducting settling studies, microscopic examination, and counting and sizing techniques.

In the method of the invention, the analyzed discontinuous mixture is then introduced into a laminar flow separator having a plurality of discrete sets of fluid interrupting surfaces arranged in series one after the other. Based on the properties determined in the analysis step, the configurations of the fluid interrupting surfaces within the separator are correlated according to the analyzed characteristic of the discontinuous mixture. The components are separated from one another as the fluid flows through the laminar flow separator and the separated components are then removed from the laminar flow separator.

Figure 2:
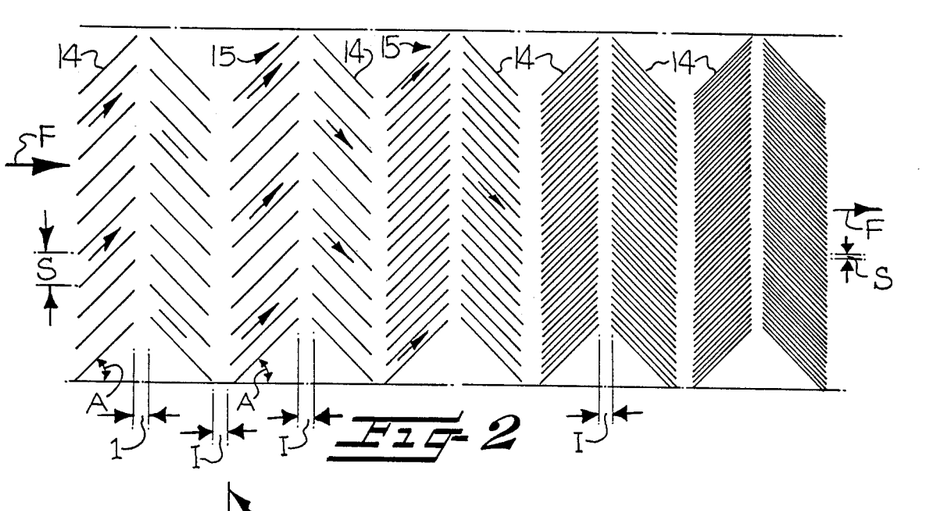
FIG. 2 is a stylized, cross-sectional view of the interrupting surfaces of the method and apparatus of the present invention.
Figure 6:
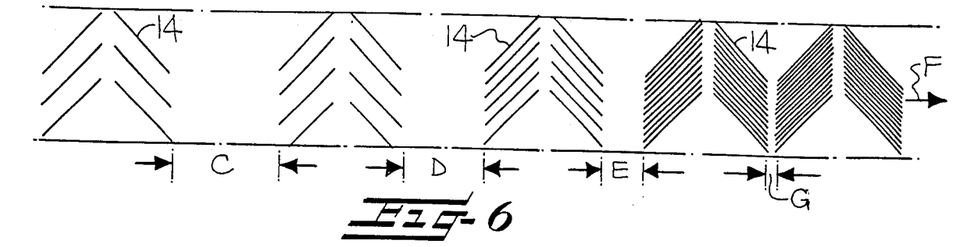
FIG. 6 is a cross-sectional view of a large number of the separating surfaces of the present invention arranged in stacked series one after the other.

As stated previously herein, the interrupting surfaces used in the method and apparatus of the present invention comprise discrete sets of interrupting surfaces which in a preferred embodiment of the invention, and as best illustrated in FIGS. 2 and 6, comprise discrete sets broadly designated at 15 of generally parallel vanes 14 with the discrete sets arranged in series one after the other and separated by predetermined gaps I (FIG. 2) between one another. The gaps I between discrete sets are a novel feature of the present invention, as most laminar flow and coalescing-type separators use continuous fixed plates or configurations which occupy substantially all of the volume of the separator. It has been found according to the present invention, however, that continuous plates are unnecessary to achieve laminar flow, and that laminar flow can be achieved using such discrete sets of surfaces.

Figure 7:
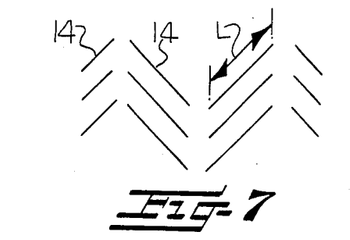
FIGS. 7 and 8 are stylized cross-sectional views of other potential arrangements of the interrupting surfaces of the present invention.
Figure 8:
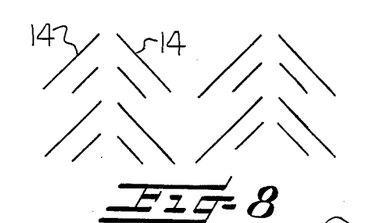

Further to the present invention, and in addition to selecting predetermined gaps between discrete sets 15 of the interrupting surfaces, the spacing S between the individual surfaces 14 can likewise be adjusted or varied to optimize the separation of any given discontinuous mixture depending on its analyzed characteristics. In FIG. 2, the spacing S is illustrated as becoming progressively smaller along the fluid flow path F. In a like manner, the sizes or lengths L of the fluid interrupting surfaces can be chosen to maximize laminar flow, wetting, coalescence and agglomeration (FIGS. 7 and 8). As illustrated in FIG. 2, the invention also comprises directing the discontinuous mixture along a predetermined flow path F and then placing the generally parallel vanes 14 of the preferred embodiment at one or more selected angles A with respect to the flow path F according to the analyzed characteristics of the mixture.

As a final advantage to the broad features of the invention, the use of the smaller individual interrupting surfaces 14 rather than large tilted or horizontally or vertically disposed plates enables the surfaces to be formed from a variety of materials. Heretofore coalescing plates have tended to be formed of specific materials such as plastics which have the disadvantages of having fixed surface characteristics, reactivity with the organic material to be separated and lack of physical and chemical integrity at higher temperatures. In contrast, because they represent a smaller amount of material overall, the surfaces 14 of the present invention can be made of any number of materials including some more suitable for operation at higher temperatures. As a result, the method of the invention can further comprise keeping the discontinuous mixture at elevated temperatures at which separation is enhanced.

Although correlation can proceed according to a number of known mathematical models, most of the models will rely on some or all of the factors set out earlier herein. For example, gravitational separation is related to the movement of individual particles or droplets of one phase among those of another. This movement is related to viscosity which in turn is affected by temperature. Consequently, all of these factors must be evaluated in order to develop any reasonable prediction of particle or droplet behavior. Because larger particles tend to coalesce and separate more easily than do smaller ones, the droplet size distribution, i.e. the percentage of the total number of particles which are of one or more particular sizes, also relates directly to the separation efficiency. The population density affects the frequency with which particles collide, and as set out herein, collisions tend to enhance aggregation, coalescence and separation. Other factors which can be controlled externally include the velocity of fluid flow and the volume of flow per unit of time. Additionally, the size of the particle or droplet will significantly determine whether or not it is affected by plate spacing of any given size. Larger droplets will tend to coalesce more readily on their own and small plate spacing would only encourage them to break up and reemulsify. Alternatively, smaller droplets will not coalesce unless encouraged to do so by more frequent collisions and large plate spacing would allow such particles to essentially behave as if no surfaces were present at all.

Accordingly, the motion of particles or droplets, their agglomeration and coalescence, and their eventual separation as a discrete component will be the vector resultant of all the forces acting upon them. These will include the forces represented by the external flow of the fluid, gravity, physical attraction or repulsion between like or unlike particles, kinetic energy and a number of other forces which may or may not be observable or subject to theoretical prediction.

As an example of how correlation can proceed, placing the individual interrupting surfaces closer to one another within discreet sets or stacks provides a shorter average distance that a particle or droplet must travel before being intercepted by a surface. For larger particles or droplets, which as stated earlier tend to separate more easily, larger spacing is not only sufficient, but also desirable. Alternatively, for smaller particles, upon which the force of gravity is less influential than are other forces, the spaces between surfaces must be reduced so that the smaller particles will contact the surfaces more frequently, thus encouraging their aggregation, coalescence and separation.

Finally, because the separation characteristics of the mixture change as the mixture moves through a separator, an even more efficient separation can be accomplished by changing the configuration as the mixture moves through the separator, as provided by the present invention.

The invention further includes using the analysis to not only correlate the configuration of the vanes in all of the discrete sets, but, having analyzed the components, to initially correlate the configuration of the vanes 14 in the first discrete set of the separator according to the analyzed characteristics of the discontinuous mixture and then progressively correlate the configurations of the second and each succeeding discrete set of vanes according to the separation achieved at the preceding set of plates. In other words, based on the analyzed characteristics of the mixture, the first set of vanes can be so configured as to maximize the separation of the discontinuous mixture as it exists when it enters the separator. Based on the initial analysis, the knowledge of the fixed length L, angle A and spacing S, the characteristics of the mixture upon exiting the first discrete set of vanes can be predicted. The configuration of the second set of vanes can then be made different from that of the first set in order to provide an ideal separation environment for the mixture as characterized after its exit from the first discrete set of vanes, rather than for the initially analyzed mixture. In a similar manner, the configurations of all following discrete sets can be tailored to the predicted characteristics of the mixture as it exits each preceding discrete set. It is anticipated that in particular embodiments of the invention, the vanes can be placed as far apart as 12 inches from one another within a discrete set to as close together as 0.010 inches within a discrete set.

As a further refinement on this technique, the invention can further comprise correlating the configuraation of the plates in not necessarily the first, but in certain other discrete sets of the separator according to the analyzed characteristics of the discontinuous mixture, monitoring the characteristics of the mixture intermediate of selected discrete sets of vanes and then correlating the configuration of selected discrete sets of vanes according to the intermediately monitored characteristics of the discontinuous mixture. In this embodiment, rather than depend upon the intial prediction for the most ideal configurations, the intermediate monitoring and configuring of the surfaces can achieve an even greater degree of specificity.

Thus, in an overall most active embodiment, the invention comprises analyzing the physical, chemical and statistical characteristics of the discontinuous mixture and its components, introducing the discontinuous mixture into a laminar flow separator which has a plurality of discrete sets of generally parallel vanes arranged in series one after the other and directing the discontinuous mixture along a predetermined flow path within the separator. Predetermined gaps are selected between discrete sets of the vanes, predetermined spacings are selected between individual vanes within the discrete sets and the generally parallel vanes are placed at selected angles with respect to the flow path within the separator, all according to the analyzed characteristics of the mixture. Additionally, the characteristics of the mixture are monitored intermediate of selected discrete sets of vanes and based on the monitored characteristics, predetermined gaps between discrete sets of vanes and predetermined spacing between individual vanes within the discrete sets are both selected as are the predetermined angles of the vanes within the separator. As the discontinuous mixture proceeds through the separator, the components are separated from one another and then removed from the laminar flow separator.

Figure 1:
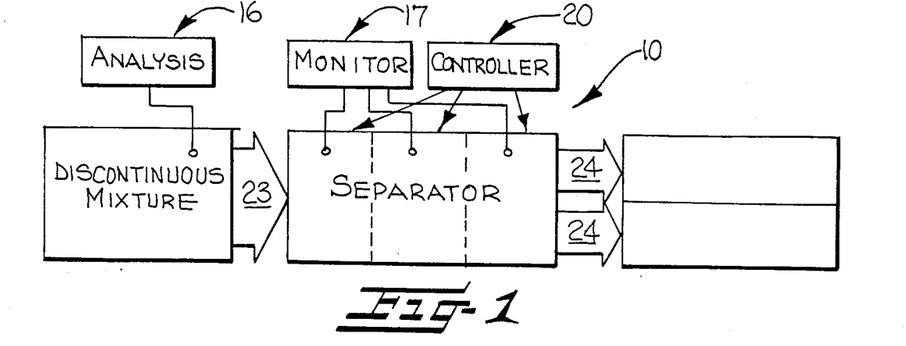
FIG. 1 is a schematic representation of the primary elements of the invention.

The invention additionally comprises an apparatus for accomplishing the method of the invention. In addition to the novel characteristics of the separator itself, the apparatus can also broadly comprise means for analyzing the physical, chemical and statistical characteristics of a discontinuous mixture on-site and over a suitable time interval to establish ranges and variations in the mixture's characteristics. By calculating best and worst-case conditions, a much more efficient laminar flow separator can be designed and manufactured. Its components are shown in FIG. 1 as the analyzer 16 and the monitor 17; means shown schematically as the inlet means 23 for introducing the analyzed discontinuous mixture into a laminar flow separator 25; a plurality of discrete sets of fluid interrupting surfaces therein arranged in series one after the other; means for correlating the configuration of the fluid interrupting surfaces within the separator according to the analyzed characteristics of the discontinuous mixture, shown as the controller 20; and means for removing separated components from the laminar flow separator, shown schematically as the outlet means 24. In particular embodiments, the characteristics of the mixture can be monitored between discrete sets of surfaces as well in order to analyze the progressive separation of the mixture within the separator.

Presently, the means for removing separated components can comprise a drag conveyor for removing separated solid materials from the bottom of the separator as well as floating, moving or fixed skimmers for removing a less dense liquid from the upper portions of the separator.

Figure 9:
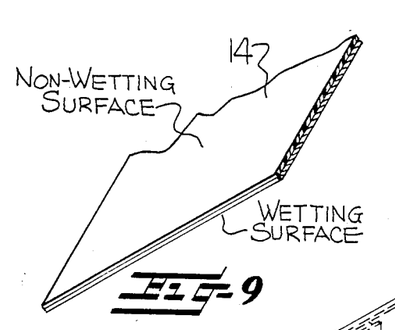
FIG. 9 is a cross-sectional perspective view of a single interrupting surface of the present invention.
Figure 10:
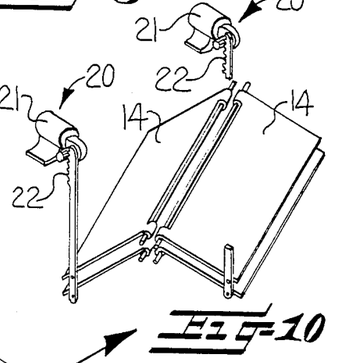
FIG. 10 is a partial perspective view illustrating potential movement and configuration of the surfaces of the present invention in response to the computer's analysis of the mixture.
Figures 11, 12:
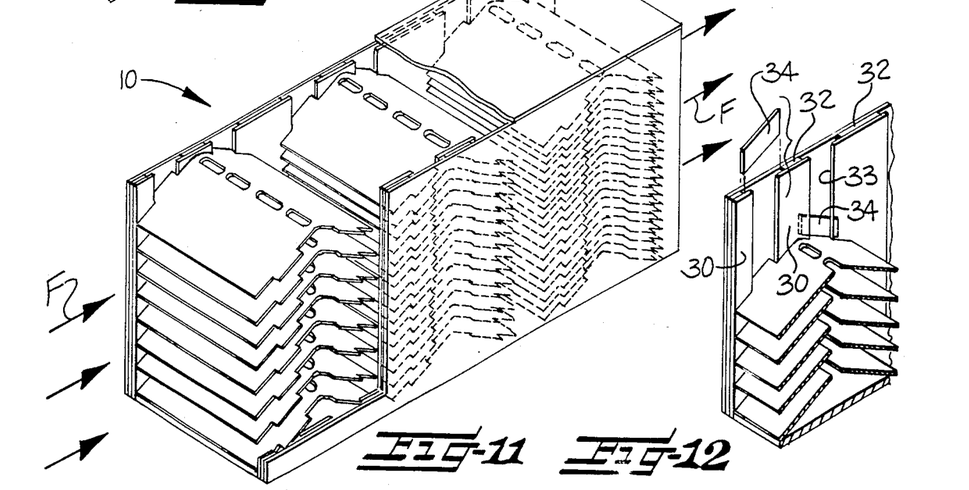
FIG. 11 is a stylized perspective view of one embodiment of a separator according to the present invention.
FIG. 12 is a detailed fragmentary view of a portion of the separator illustrated in FIG. 11.
Figure 13:
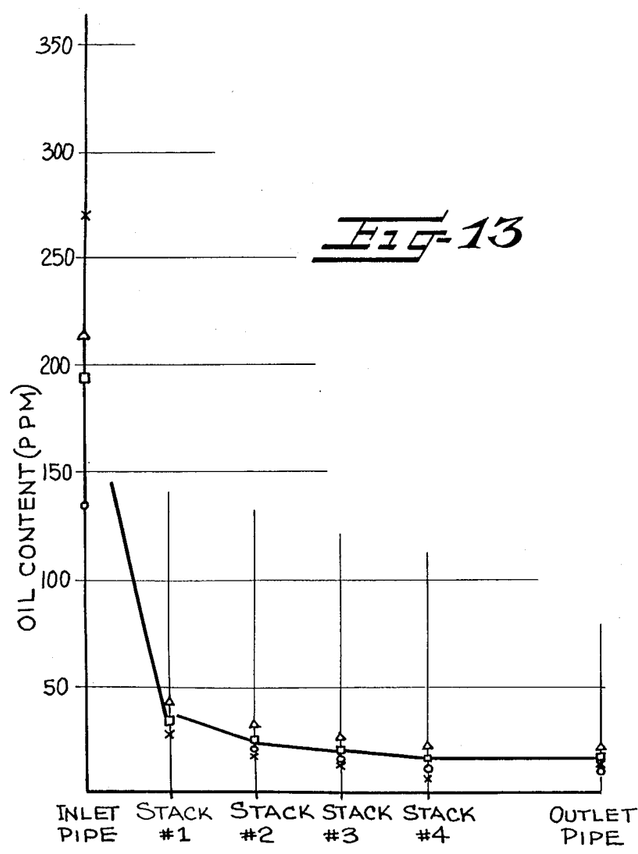
FIGS. 13 and 14 are graphical representations of separation results achieved with the present invention.

As seen broadly in FIG. 11 and in more detail in FIGS. 2 through 10, in preferred embodiments of the invention the fluid interrupting surfaces comprise generally parallel vanes 14 each of which comprises a generally rectangular planar or V-shaped slat having a width relatively larger than its length and a relatively narrow thickness. As seen in FIG. 9, in particular embodiments the slats 14 can comprise upper and lower surfaces designated as 14a and 14b respectively in which the upper surface 14a comprises a substantially nonwettable material and the lower surface 14b comprises a substantially wettable material. Depending upon the mixture, however, the nature of each of the respective surfaces can be the opposite with the wetting surface on the top and the nonwetting surface on the bottom or both surfaces can be wetting surfaces or both surfaces non-wetting surfaces.

In other embodiments, the surface geometry can be tailored to enhance the separation process. In other words, even though the overall dimensions of the fluid interrupting surfaces may be rectangular and planar, on a smaller scale the surfaces could also comprise a number of small polyhedra or the like which could enhance the flocculation and coalescence of particular components.

As seen in FIGS. 2 and 6, each of the discrete sets of vanes comprises a vertical stack 15 of individual slats 14. Within each stack 15 the planes of the slats 14 are arranged generally parallel to one another and spaced a predetermined distance S apart from one another with the slats' larger dimensions arranged generally perpendicularly to the fluid flow path F and with the stack forming an array perpendicular to the fluid flow path F. Alternatively, and as illustrated in FIGS. 3, 4 and 5, the vanes 14 can comprise generally V-shaped slats designated 16 with each of the sides of the V having a width relatively larger than its length and relatively wider than the web of the V and having a relatively narrow thickness.

Figures 3, 4:
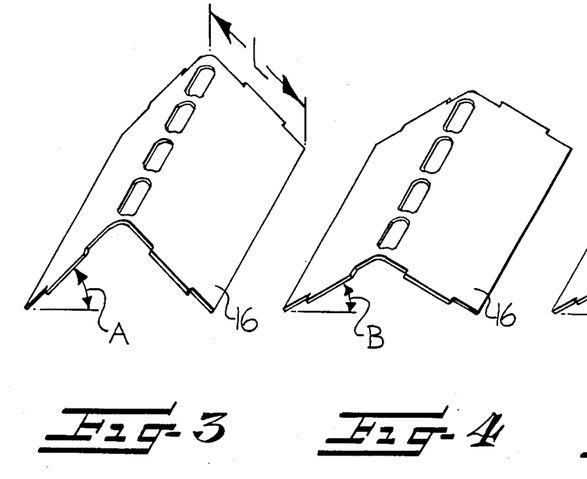
FIG. 3 is a perspective view of an interrupting surface of particular size and geometry.
FIG. 4 is a perspective view of another interrupting surface having a particular size and geometry.
Figure 5:
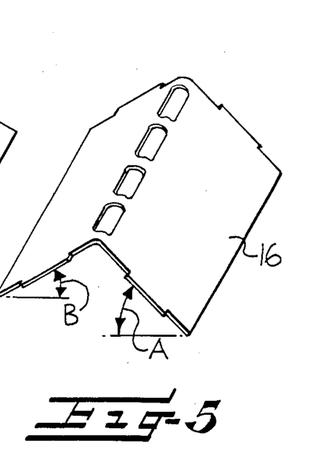
FIG. 5 is a perspective view of a third interrupting surface of particular size and geometry.

In the particular embodiments illustrated in FIGS. 3, 4 and 5, the two sides of the V-shaped slats 26 are joined at the apex by small web portions 27 which leave relatively large openings 28 in between. Additionally, the vane shown in FIG. 3 is designed to be configured at a relatively steeper angle A with respect to a fluid flow path than is the vane in FIG. 4 which is designed to be configured at indicated angle B. FIG. 5 illustrates just one of the many tailored configurations made possible by the invention by showing a vane having one side designed to be configured at angle A and the other side at angle B. As stated earlier herein, the vanes form smaller discrete sets of interrupting surfaces rather than large plates extending throughout the separator, with each set having equal or differing spacing within. Consequently, the vanes themselves can be formed of metal which offers the advantage of higher operating temperatures and a resulting improvement in separation of the mixture. Additionally, such individual metal plates require less volume and can even weigh less than conventional plastic plates while offering the same surface area for separation.

It will be understood that although the description of the preferred embodiments discloses several specific geometries for the vanes and the stacks and for their arrangement with respect to the flow path F, there also exist a number of other geometries which, while not specifically mentioned in the description of the preferred embodiments, fall within the scope of the invention, the specification and the claims.

Generally speaking, the configuration of the vanes can be selected or adjusted in any one or more of several ways. First, a preferred embodiment of the invention will include means for directing the analyzed discontinuous mixture along a predetermined fluid flow path F and means for selecting or adjusting the angles A of the vanes with respect to the fluid flow path F. This is perhaps best illustrated in FIG. 2 in which the fluid flow path F is designated by the horizontal arrows and the angle that the plates form with respect to the fluid flow path is designated A. Similarly, in FIG. 10 the controllers 20 are broadly illustrated as controlling a mechanism of a motor 21 and a linkage 22 for adjusting the position of vanes 14 with respect to the fluid flow path F.

Additionally, the gaps between the discrete sets or stacks 15 of the fluid interrupting surfaces 14 can likewise be selected or adjusted so as to increase or decrease the distance of fluid flow between respective adjacent discrete sets. This space will be predetermined according to the analysis of the mixture and the resulting anticipated characteristics or the discontinuous phase. FIG. 6 illustrates a number of different spacings some of which are designated C, D, E and G.

Another means of selection, and perhaps the most significant one in terms of separation efficiency, is the selection and potential adjustment of the spacing S between individual interrupting surfaces 14 within the discrete sets 15. Most commonly, the spacings will be selected and predetermined to optimize the progressive separation of the mixture from stack to stack, based on the analyzed characteristics of the mixture.

Typically, because each of the discrete sets 15 will accomplish some degree of separation as the mixture flows therethrough, the characteristics of the mixture will be somewhat, if only slightly, different as the mixture enters the next adjacent discrete set. Generally, the difference will be reflected in a slightly less discontinuous mixture, or more specifically a discontinuous mixture in which the discontinuous phase comprises smaller and smaller particles or droplets, or agglomerations of particles or droplets. Accordingly, in preferred embodiments of the invention the spacing between the individual surfaces within each of the stacks will be positioned so that the spacings become progressively smaller from stack to stack along the fluid flow path F between the inlet means 23 and the outlet means 24 of the separator. FIG. 2 illustrates such an arrangement in a general fashion.

In this regard, the spacing S between individual plates within stacks is critical in accomplishing flocculation and coalescence, while the spacing between stacks, e.g. I etc., is selected to enhance the "weep rate"—the rate of movement of the separated phase—and thus prevent clogging.

FIG. 12 best illustrates a simple yet effective vertically adjustable mounting means for varying the spacing between the slats, combined with laterally adjustable mounting means for varying the size of the gaps between adjacent stacks. FIG. 12 shows that the spacing between adjacent stacks can be set by positioning respective vertical standards 30 along the flow path F. Because the slats shown in FIGS. 3 through 6, 11 and 12 have laterally extending tabs 31 thereon which engage the standards 30, the position of the slats 26 within the separator can be selected by positioning the standards 30.

Additionally, in certain embodiments the standards 30 can be offset from the side of the separator 10 by a series of studs 32 upon which the standards can be carried. Where the standards 30 are wider than the studs 32, as is illustrated in FIG. 12, a channel 33 is formed into which spacers 34 can be positioned. In the embodiment illustrated, the spaces 34 also engage the tabs 31 on the slats 26 to thereby position the slats 26 at the desired vertical distance from one another within each stack 15.

As a result, the apparatus provides a means for accomplishing more selective degrees of separation as the discontinuous mixture flowing through the apparatus becomes progressively more separated and contains progressively smaller individual particles or agglomerations of the discontinuous phase.

It will thus be seen that the invention provides a method and apparatus for greatly enhancing the separation of discontinuous mixtures into their respective components in which the continuous phase is a liquid. First, because the method includes analysis of the characteristics of the mixture to determine those parameters most important with respect to the behavior of small discontinuous particles within a fluid, the method and apparatus provides a means of tailoring the separator to the particular mixture being separated and to a number of different mixtures which can be so analyzed.

Secondly, because the method and apparatus of the invention can comprise so many configurations, the invention provides a novel way of separating several different discontinuous phases and different types of discontinuous phases from a continuous phase, e.g. separating both oil and solid residue from water or water-base solvents. Furthermore, the different discontinuous phases can be removed at selected positions within the separator. The separator's initial stacks can be configured to separate larger and then smaller solid particles while leaving the liquid-liquid mixture alone. Later stacks in the separator's progression can then be configured to separate the liquids from one another. Previously, the separation of both solid and liquid discontinuous phases from one another and from a continuous phase in which they were both present required separate separation stages, one configured generally vertically to allow the solids to fall, and one configured generally horizontally to encourage the discontinuous liquid phase to coalesce.

Thirdly, because the method uses, and the apparatus provides, means for predicting the behavior of the characterized mixture, the arrangement of the separation surfaces within the apparatus and in the practice of the method need not be a constant unvarying configuration, but rather can comprise many different configurations all within the same separator and all intended to enhance the progressive separation of the mixture as it progresses through the separator. For example, the plates can be curved or planar, wide or narrow, angled identically or differently, or even tilted from the horizontal and different configurations of all of these types can follow each other from stack to stack depending upon the analyzed characteristics of the discontinuous mixture and its components.

EXAMPLE I

In order to test the system, oil was mixed with ordinary tap water using a centrifugal pump to form an emulsion. The concentration of oil was approximately 200 parts per million. The mixture was directed through a separator of overall configuration similar to that illustrated in FIG. 11, but having four stacks of separator plates, rather than the three illustrated. Each of the stacks included a stack of V-shaped plates which extended for six inches from point to point at the web of the V. The sides of the Vs of all of the individual plates within each stack were configured at an angle of 45 degrees with respect to the horizontal, and each stack was positioned approximately one-half inch apart from the adjacent stacks. In the first of the four stacks, the plates were spaced one inch apart from one another, in the second stack one-half inch from one another, in the third stack one-quarter inch from one another and in the fourth and last stack they were spaced one-eighth of an inch from one another.

The mixture was directed through the separator at a rate of 6 gallons per minute which translated to a linear velocity of approximately 1 foot per minute, well within the laminar flow range.

In order to determine the characteristics of the mixture at each point of measurement, concentration samples were removed prior to the mixture's entry into the separator and after each stack. Samples of between 150 and 250 milliliters (ml), were acidified and the oil was extracted with an organic solvent. The oil content was measured by infrared (IR) absorbance in a Horiba oil content monitor, which is an EPA approved method of measurement and which provides an accuracy within 10 percent.

Oil droplet sizes in each sample were determined by placing 1 ml of the sample in a counting cell such as that typically used in marine sciences for counting plankton in seawater. This technique is adequate for the evaluation of oil droplet sizes present, provided that the sizes and population are such that the oil is not so concentrated as to wet the glass of the counting cell.

Using this system, it was determined that oil droplets at the inlet side of the separator had a maximum diameter of 80 microns. After passing through the first stack, the maximum droplet size was 45 microns, after the second stack 25 microns, after the third stack 20 microns and after the last stack 15 microns. The reduction in the droplet size of the discontinuous phase is directly proportional to the amount of oil removed. Expressed as amounts, the mixture entering the separator had an oil concentration of 200 parts per million (ppm), after exiting the first stack it had a concentration of approximately 35 ppm, after the second stack 25 ppm, after the third stack 20 ppm and after the fourth stack 15 ppm.

EXAMPLE II

Figure 14:
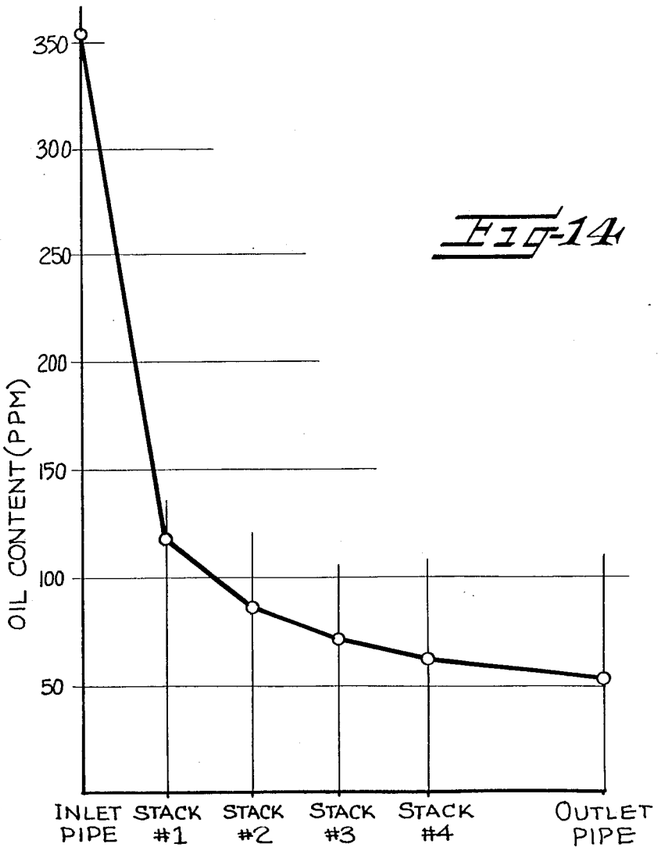

A second test was run under identical conditions to Example I with the exception that the plates used had a dimension of three inches from point to point across the web of their V shape and the initial concentration of oil was 350 ppm. All other conditions including flow rate and plate angles were identical. The maximum droplet size at the inlet was again determined to be 80 microns. After passing through the first stack, the maximum particle size was 70 microns and the concentration was 120 ppm, after the second stack 50 microns and the concentration 85 ppm, after the third stack 30 microns and the concentration 70 ppm and after the fourth stack 25 microns and the concentration 60 ppm. These results are similarly expressed in FIG. 14.

EXAMPLE III

A third test was run with all conditions identical to those of Example II with the exception that the flow rate was maintained at approximately 0.5 ft./min. rather than 1 ft./min. Under these conditions, the effluent after the fourth stack had concentration of 15 ppm which was identical to the results obtained in Example I using larger plates and faster flow rates.

By using known concentrations in test emulsions, the actual separation results can be compared to any given predictive model. Based on the differences between theory and practice, the model can be refined to more accurately reflect actual separation behavior. With the model developed to a satisfactory level of predictive accuracy, the surfaces in the separator can be more precisely correlated to enhance separation. The process of testing a given configuration, comparing its results to theory, refining the theory and then retesting a configuration can be repeated as many times as needed to achieve the degree of predictive accuracy desired or required in any particular situation.

Furthermore, once a model and related correlated configurations have been developed to a satisfactory degree, the composition of unknown, unanalyzed mixtures can be determined by observing the separation which takes place and then extrapolating these results to predict the original composition. The present invention thus provides a method and apparatus for analyzing unknown mixtures as well as a method and apparatus for enhancing the separation of mixtures which have been or can be analyzed.

The foregoing embodiments are to be considered illustrative, rather than restrictive of the invention, and those modifications which come within the meaning and range of equivalents of the claims are to be included therein.

That which is claimed is:

1. An apparatus for separating the components of a mixture of a continuous phase and a discontinuous phase in which the continuous phase comprises a liquid; said apparatus comprising:
   (a) a laminar flow separator comprising a series of vertical stacks of fluid interrupting surfaces arranged in longitudinally spaced apart relation from one another forming gaps therebetween for accommodating changes in a discontinuous mixture as the mixture passes through the separator;
   (b) inlet means positioned at one end of said series of stacks and outlet means positioned at the other end thereof, said inlet and outlet means defining a fluid flow path for directing a discontinuous mixture successively through each of the stacks of said series in a direction transverse to said fluid interrupting surfaces and transverse to said gaps between said vertical stacks and for progressively separating the components of the mixture from one another;
   (c) each of said vertical stacks comprising a plurality of slats arranged generally parallel to one another in spaced apart relation and defining said fluid interrupting surfaces, each slat having its longitudinal dimension arranged generally perpendicular to the fluid flow path and with said stack oriented perpendicular to the fluid flow path; and
   (d) wherein the spacings between adjacent slats of said stacks are progressively smaller in said series along said fluid flow path between said inlet means and said outlet means.

2. An apparatus according to claim 1 wherein each of said stacks has a width relatively larger than its length and a relatively narrow thickness.

3. An apparatus according to claim 2 wherein each of said slats is of a generally V-shaped configuration.

4. An apparatus according to claim 1 wherein the planes of said slats are positioned at predetermined angles with respect to the fluid flow path.

5. An apparatus according to claim 1 wherein said slats are formed of a metal.

6. An apparatus according to claim 1 wherein the gaps between adjacent stacks in said series are progressively smaller along said fluid flow path between said inlet means and said outlet means.

7. An apparatus according to claim 1 further comprising laterally adjustable mounting means for at least some of said stacks for varying the size of said gaps between adjacent stacks.

8. An apparatus according to claim 1 wherein each stack comprises vertically adjustable mounting means for said slats for varying the spacing between slats.

9. An apparatus for separating the components of a mixture of a continuous phase and a discontinuous phase in which the continuous phase comprises a liquid; said apparatus comprising:

(a) means for analyzing the physical, chemical and statistical characteristics of the discontinuous mixture and its components;

(b) means for introducing the analyzed discontinuous mixture into a laminar flow separator, said separator comprising a plurality of discrete sets of fluid interrupting surfaces arranged in series one after the other;

(c) means for correlating the relative spacings and positions of said fluid interrupting surfaces with respect to one another within said separator according to the analyzed characteristics of the discontinuous mixture; and (d) means for removing separated components from said laminar flow separator.

10. An apparatus according to claim 9 wherein said fluid interrupting surfaces comprise generally parallel vanes.

11. An apparatus for separating the components of a mixture of a continuous phase and a discontinuous phase in which the continuous phase comprises a liquid, said apparatus comprising:

means for analyzing the physical, chemical and statistical characteristics of the discontinuous mixture and its components;

a laminar flow separator comprising:
a separator housing,
inlet means in communication with said housing for introducing mixtures to be separated into said housing,
outlet means in communication with said housing for removing separator components from the housing, said inlet means, said outlet means and said housing defining a fluid flow path within said housing, and
a plurality of discrete sets of generally parallel laminar flow vanes positioned within said housing and arranged in series one after the other transverse to said fluid flow path for encouraging laminar flow as a discontinuous mixture flows through said housing;

means for adjusting the spacing between individual vanes within each said discrete set in the housing according to the analyzed characteristics of the discontinuous mixture; and means for removing separated components from said laminar flow separator.

12. An apparatus according to claim 11 further comprising means for directing the analyzed discontinuous mixture along the predetermined fluid flow path and means for adjusting the angles of said vanes with respect to the fluid flow path.

13. An apparatus according to claim 11 further comprising means for adjusting the gaps between said discrete sets of vanes.

14. An apparatus according to claim 11 wherein said vanes comprise generally rectangular planar slats, each having a width relatively larger then its length and a relatively narrow thickness.

15. An apparatus according to claim 14 wherein said slats comprise upper and lower surfaces and where said upper surface comprises a substantially nonwettable material and said lower surface comprises a substantially wettable material.

16. An apparatus according to claim 14 wherein at least one of said discrete sets of vanes comprises:
a vertical stack of said slats, the planes of which are arranged generally parallel to one another and spaced a predetermined distance apart from one another with their larger dimension arranged generally perpendicular to the fluid flow path and with the stack forming an array perpendicular to the fluid flow path.

17. An apparatus according to claim 16 wherein the planes of said slats are positioned at a predetermined angle with respect to the fluid flow path.

18. An apparatus according to claim 16 wherein the predetermined distances between slats in respective stacks is progressively smaller along said fluid flow path between said inlet mean and said outlet means.

19. An apparatus according to claim 14 wherein each of said slats is of a generally V-shaped configuration.

20. An apparatus according to claim 11 wherein said vanes are formed of a metal.

21. An apparatus according to claim 20 wherein the gaps between said vertical stacks are progressively smaller along said fluid flow path between said inlet means and said outlet means.

22. A method for separating the components of a mixture of a continuous phase and a discontinuous phase in which the continuous phase comprises a liquid by directing the discontinuous mixture along a fluid flow path between an inlet and an oulet and successively through a series of vertical stacks of fluid interrupting surfaces which are arranged in longitudinally spaced apart relation from one another with gaps therebetween, said method comprising:

(a) directing the discontinuous mixture through a first stack of fluid interrupting surfaces so configured as to effect coalescence and separation of a first fraction of the discontinuous phase;

(b) removing the coalesced first fraction of the discontinuous phase from the first gap as the mixture exits the first stack;

(c) directing the remaining portion of the discontinuous mixture through the next successive stack of fluid interrupting surfaces having a different horizontal spacing therebetween than the horizontal spacing between the surfaces in the preceding stack so as to effect coalescence and separation of a next fraction of the discontinuous phase having a composition different from the fraction coalesced at the preceding stack;

(d) removing the coalesced next fraction of the discontinuous phase from a next gap having a width different from the width of the preceding gap as the mixture exits the stack;

(e) repeating steps (c) and (d) until the discontinuous mixture reaches the outlet; and (f) removing the remaining mixture from the outlet.

23. A method according to claim 22 wherein step (c) comprises directing the remaining portion of the discontinuous mixture through the next successive stack wherein the individual fluid interrupting surfaces within the stack are horizontally more closely spaced together than in the preceding stack so as to effect coalescence and separation of a next fraction which comprises smaller members of the discontinuous phase.

24. A method according to claim 22 or claim 23 wherein step (d) comprises directing the mixture from the stack across a next gap narrower than the preceding gap and removing the coalesced next fraction of the discontinuous phase.

25. A method of separating the components of a mixture of a continuous phase and a discontinuous phase in which the continuous phase comprises a liquid; said method comprising:
- (a) analyzing and determining the physical, chemical and statistical characteristics of the discontinuous mixture and its components;
- (b) introducing the analyzed discontinuous mixture into a laminar flow separator having a plurality of discrete sets of fluid interrupting surfaces arranged in series one after the other;
- (c) correlating the configuration of the fluid interrupting surfaces within the separator according to the analyzed characteristics of the discontinuous mixture;
- (d) separating the components from one another in the laminar flow separator; and
- (e) removing the separated components from the laminar flow separator.

26. A method according to claim 25 further comprising analyzing the temperature, density and viscosity of the liquid continuous phase.

27. A method according to claim 25 in which the discontinuous phase comprises a liquid and further comprising analyzing the droplet size distribution, population, density and viscosity of the discontinuous liquid phase.

28. A method according to claim 25 in which the discontinuous phase comprises one or more types of solids and further comprising analyzing the size, population, density, shape and texture of the particles of the discontinuous solid phase.

29. A method according to claim 25 further comprising analyzing the emulsion stability of the discontinuous mixture.

30. A method according to claim 25 further comprising selecting predetermined gaps between discrete sets of interrupting surfaces.

31. A method according to claim 25 further comprising selecting predetermined spacing between individual interrupting surfaces within the discrete sets.

32. A method according to claim 25 further comprising introducing the analyzed discontinuous mixture into a laminar flow separator having a plurality of discrete sets of generally parallel vanes with the discrete sets arranged in series one after the other and separated predetermined distances from one another.

33. A method according to claim 32 further comprising directing the discontinuous mixture along a predetermined flow path and placing the generally parallel vanes at selected angles with respect to the flow path according to the analyzed characteristics of the mixture.

34. A method according to claim 25 further comprising selecting the size of the fluid interrupting surfaces according to the analyzed characteristics of the discontinuous mixture.

35. A method according to claim 25 further comprising selecting the surface characteristics of the fluid interrupting surfaces according to the analyzed characteristics of the discontinuous mixture.

36. A method according to claim 25 further comprising keeping the discontinuous mixture at an elevated temperature.

37. A method of separating the components of a mixture of a continuous phase and a discontinuous phase in which the continuous phase comprises a liquid; said method comprising:
- (a) analyzing the physical, chemical and statistical characteristics of the discontinuous mixture and its components;
- (b) introducing the discontinuous mixture into a laminar flow separator having a plurality of discrete sets of generally parallel vanes arranged in series one after the other;
- (c) correlating the configuration of the vanes in the first discrete set of the separator according to the analyzed characteristics of the discontinuous mixture;
- (d) progressively correlating the configuration of the second and each succeeding discrete set of vanes according to the analyzed characteristics of the discontinuous mixture and according to the separation achieved at the preceding set of plates;
- (e) separating the components from one another in the laminar flow separator; and
- (f) removing the separated components from the laminar flow separator.

38. A method according to claim 37 further comprising:
- (a) correlating the configuration of the plates in certain discrete sets of the separator according to the analyzed characteristics of the discontinuous mixture;
- (b) monitoring the characteristics of the mixture intermediate of selected discrete sets of vanes; and
- (c) correlating the configuration of selected discrete sets of vanes according to the intermediately monitored characteristics of the discontinuous mixture.

39. A method of separating the components of a mixture of a continuous phase and a discontinuous phase in which the continuous phase comprises a liquid, said method comprising:
- (a) analyzing the physical, chemical and statistical characteristics of the discontinuous mixture and its components;
- (b) introducing the discontinuous mixture into a laminar flow separator having a plurality of discrete sets of generally parallel vanes arranged in series one after the other and directing the discontinuous mixture along a predetermined flow path within the separator;
- (c) selecting predetermined gaps between discrete sets of the vanes and selecting predetermined spacing between individual vanes within the discrete sets and placing the generally parallel vanes at selected angles with respect to the flow path within the separator according to the analyzed characteristics of the mixture;
- (d) monitoring the characteristics of the mixture intermediate of selected discrete sets of vanes;
- (e) selecting predetermined gaps between discrete sets of vanes and selecting predetermined spacing between individual vanes within the discrete sets and placing the vanes at selected angles within the separator all according to the intermediately monitored characteristics of the discontinuous mixture;
- (f) separating the components from one another in the laminar flow separator; and
- (g) removing the separated components from the laminar flow separator.

* * * * *